United States Patent Office 3,095,414
Patented June 25, 1963

3,095,414
SYNTHESIS OF CERTAIN SUBSTITUTED TRIAZINES
James D. Spainhour, Bartlesville, Okla., assignor to Phillips Petroleum Company, a corporation of Delaware
No Drawing. Filed July 1, 1960, Ser. No. 40,173
6 Claims. (Cl. 260—248)

This invention relates to substituted triazines. In one of its aspects, the invention relates to certain substituted triazines. In another of its aspects, the invention relates to the preparation of certain substituted triazines. In a further aspect of the invention, it relates to a process for the production of 2,4,6-trisubstituted triazines by the trimerization of nitriles in the presence of a catalyst system comprising at least one of a salt or an alcoholate of a metal of Groups IV, VA, VIA, and VIII together with an organometal compound of a metal of Group II or III of the Periodic System (Mendeleeff's Table, Lange's Handbook of Chemistry, 18–19 (1941)), such organometal compounds including those in which one or more but not all of the organic groups are replaced by halogen.

It is an object of this invention to produce certain substituted triazines. It is a further object of this invention to provide a method of producing certain substituted triazines. It is a further object of this invention to provide an alternate method for the production of certain substituted triazines.

Other aspects, objects and the several advantages of this invention are apparent from a study of this disclosure and the appended claims.

The nitriles trimerized in the present process are those which can be described by the general formula $RC \equiv N$, wherein R represents a radical from the group consisting of aryl, substituted aryl, alkyl, and substituted alkyl radicals, the $-C \equiv N$ group being attached to a carbon atom of one of said groups, the remaining valences of said carbon being satisfied by members selected from the group consisting of (1) carbon atoms of an aromatic ring of which the carbon atom itself is a member, (2) three halogen atoms, (3) two methyl radicals and an alkyl group containing from one to nine carbon atoms, (4) two halogen atoms and an alkyl group containing from one to nine carbon atoms, (5) one halogen atom, one methyl group, and an alkyl group containing from one to nine carbon atoms.

In the aryl nitriles, the aryl group can be phenyl, naphthyl, or anthryl and can be substituted by one or more substituents which can be alkyl, halogen, or nitro, and when such substituents are alkyl groups, the total number of carbon atoms contained therein will not exceed five. In the alkyl nitriles, the total number of carbon atoms present, not including the cyano group, will not exceed ten, the molecular configuration being primary, secondary, or tertiary. Substituents of these alkyl nitriles are those which are inert in the reaction system such as halogen.

Examples of such nitriles include:

Benzonitrile
2-methylbenzonitrile
3-ethylbenzonitrile
4-butylbenzonitrile
3-nitrobenzonitrile
2-ethyl-4-nitrobenzonitrile
2,4-dimethylbenzonitrile
2,6-dimethylbenzonitrile
2-ethyl-3,4,5-trimethylbenzonitrile
1-naphthonitrile
2-naphthonitrile
3-methyl-1-naphthonitrile
1-cyanoanthracene
2-cyanoanthracene
Trichloroacetonitrile
Trimethylacetonitrile
Tribromoacetonitrile
2,2-dichloropropionitrile,chlorodimethylacetonitrile
2,2-dibromobutyronitrile
2,2-diodopropionitrile
2,2-diiodobutyronitrile
2-iodo-2-methylvaleronitrile
2,2-difluoro-1-decylcyanide and the like.

As noted, the catalysts employed comprise a salt or alcoholate of a metal of Groups IV, VA, VIA, and VIII, used in combination with an organometal compound of a metal of Groups II and III of the periodic system. Examples of such systems include:

Combinations of titanium tetrachloride or trichloride with a trialkylaluminum
Vanadium pentachloride with a dialkyl zinc
Chromyl chloride with ethylaluminum sesquichloride [1]
Titanium tetrabutoxide with ethylaluminum sesquichloride [1]
Iridium tetrachloride and triethylaluminum The 2,4,6-trisubstituted triazines prepared by the process of the present invention are compounds having the general formula

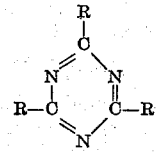

in which the R's are within the definition of R in the general formula for the nitriles given above. These products are soluble in benzene, pyridine, carbon disulfide, and hot toluene. They are useful in a wide variety of applications such as intermediates in the production of dyes, pharmaceuticals, resins, rodenticides, etc., and as ingredients for use in the compounding of polymeric materials, 2,4,6-triphenyl triazine is useful as a starting material in one procedure for the synthesis of lophine (triphenylimidazole). This synthesis is effected by a reduction in the presence of zinc and acetic acid (Journal Chemical Society, 1941, 278). Lophine has been used as a dye intermediate.

Some substituted triazines have been produced from nitriles employing strong acid catalysts such as sulfuric acid, chlorosulfonic acid, and hydrochloric acid in alcohol. The present invention provides an entirely different route to produce these compounds.

The amount of catalyst used can vary within rather broad limits, ranging from about 0.5 to 10 mol percent of total catalyst based on nitrile charged. However, greater or lesser amounts can be used. The mol ratio of Group II or III metal compound to Group IV, VA, VIA, or VIII metal compound will be in the range between about 0.50 and 4.0, preferably between about 0.75 and 3.0.

In the process of the invention, the catalyst is charged to the reactor, preferably under a blanket of nitrogen, after which the nitrile is charged, and the reactor sealed. The temperature is then elevated into the range between about 25, preferably 75, and 150° C. and maintained at this level for from 1 to 100 hours. Solvents such as cyclohexane, or paraffinic hydrocarbons can be used when desired although operations in the absence of a solvent are frequently preferred. In the given range, the temperature is raised till reaction ensues.

[1] A mixture of diethylaluminum chloride and ethylaluminum dichloride.

At the end of the reaction period, the reactor is opened and a small amount of methanol added to inactivate the catalyst. The crystalline triazine is collected on a filter, washed with methanol, and dried.

*Example I*

A series of runs was made for the synthesis of 2,4,6-triphenyl triazine from benzonitrile. In each run, the reactor was flushed with nitrogen after which a weighed amount of titanium tetrachloride was added as a solution in cyclohexane (0.20 molar), followed by a weighed amount of tributyl aluminum, also dissolved in cyclohexane (0.68 molar). A measured volume of benzonitrile was then charged and the reactor sealed. The temperature was raised to the operating level and maintained for a measured length of time, at the end of which about 30 to 40 ml. methanol was added. The reaction mixture was filtered and the crystalline product washed with methanol, after which it was dried. Data on these runs are shown below.

| Run No. | TiCl₄, mm.[1] | TBA, mm.[1] | Ratio, TBA/TiCl₄ | Nitrile, gms. | Temp., C. | Time (hr.) | Yield, gms. | Melting Point (C.) |
|---|---|---|---|---|---|---|---|---|
| 1 | 0.2 | 0.17 | 0.85 | 5 | 100 | 36 | 0.21 | [2] 238–240 |
| 2 | 0.2 | 0.42 | 2.1 | 5 | 100 | 36 | 0.46 | |
| 3 | 0.2 | 0.25 | 1.3 | 5 | 100 | 65 | 0.72 | 238–240 |
| 4 | 0.2 | 0.20 | 1.0 | 3 | 100 | 18 | 0.54 | |
| 5 | | 0.42 | | 5 | 100 | 65 | None | |
| 6 | 0.2 | | | 5 | 100 | 65 | Trace | |

[1] Millimoles.
[2] Uncorrected. Literature value 232° C.

The foregoing runs show that TiCl₄—TBA will catalyze the reaction of the invention and that both components are required to obtain a yield which is useful.

*Example II*

A series of runs was made using the same procedure as described in Example I except that in each run, 10 ml. cyclohexane solvent was added with the benzonitrile. Data on these runs are shown below.

| Run No. | TiCl₄ (mm.) | TBA (mm.) | Ratio (TBA/TiCl₄) | Nitrile (gm.) | Temp. (C.) | Time (hr.) | Yield (gm.) |
|---|---|---|---|---|---|---|---|
| 1 | 0.2 | 0.25 | 1.3 | 5 | 100 | 65 | 0.31 |
| 2 | 0.2 | 0.2 | 1.0 | 3 | 100 | 72 | 0.06 |
| 3 | 0.2 | 0.4 | 2.0 | 3 | 100 | 72 | 0.09 |

*Example III*

A run was made using the procedure of Example I but using titanium trichloride dispersed in n-heptane (0.21 molar) as a catalyst component. Data on this run are as follows:

| TiCl₃ (mm.) | TBA (mm.) | Ratio (TBA/TiCl₃) | Nitrile (gm.) | Temp. (C.) | Time (hr.) | Yield (gm.) |
|---|---|---|---|---|---|---|
| 0.21 | 0.2 | 1 | 3 | 100 | 17 | 0.06 |

*Example IV*

A run was made as described in Example I to determine whether acetonitrile, a compound in which the atom alpha to the cyano group is substituted by hydrogen, could be trimerized by the process of the invention. Data on this run were as follows:

| TiCl₄ (mm.) | TBA (mm.) | Ratio (TBA/TiCl₄) | Nitrile (gm.) | Temp. (C.) | Time (hr.) | Yield (gm.) |
|---|---|---|---|---|---|---|
| 0.20 | 0.42 | 2 | 5 | 100 | 65 | None |

*Example V*

A sample of the product from a run made in the manner described in Example I was analyzed to provide the following data:

| | Found Exp. Sample | Calculated for C₂₁H₁₅N₃ |
|---|---|---|
| Carbon, percent | 81.7 | 81.6 |
| Hydrogen, percent | 5.4 | 4.8 |
| Nitrogen, percent | 11.9 | 13.6 |

Because of the small amount of sample available, a reliable molecular weight value could not be obtained. In view of this difficulty, there was prepared a sample of 2,4,6-triphenyl triazine by the method of Pinner and Klein, Ber. 11, 764 (1878) for comparison by infrared examination with the experimental product. In this synthesis, one volume of benzonitrile was mixed with two volumes of fuming sulfuric acid and allowed to stand for 24 hours at room temperature. The precipitate of 2,4,6-triphenyl triazine (Kyaphenin) was recovered, washed, and dried. The infrared scanning on this product was identical with that obtained from the experimental sample.

Reasonable variation and modification are possible within the scope of the foregoing disclosure and the appended claims to the invention the essence of which is that there has been provided a process for the preparation of certain substituted triazines comprising essentially the trimerization of certain nitriles in the presence of catalyst, as set forth, the nitriles having the carbon atom in the alpha position to the cyano group fully substituted by other than hydrogen.

I claim:

1. A process for the preparation of a substituted triazine having the following structural characteristics

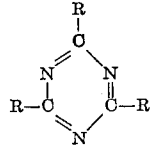

wherein R is a radical in which the carbon alpha to the ring is fully substituted by a substituent other than hydrogen and is selected from the group consisting of phenyl, naphthyl, anthryl, alkyl of 1–10 carbon atoms, substituted phenyl, substituted naphthyl, substituted anthryl, and substituted alkyl and wherein the substituents of said substituted compounds are selected from the group consisting of halogen, nitro, and alkyl of 1–5 carbon atoms which comprises contacting a nitrile having the structural characteristic R—C≡N wherein R is as previously defined and in which the carbon atom alpha to the cyano group is substituted by other than hydrogen with a catalyst selected from the group consisting of titanium tetrachloride, titanium trichloride, vanadium pentachloride, chromyl chloride, titanium tetrabutoxide, and iridium tetrachloride together with a compound selected from the group consisting of a trialklaluminum, a dialkyl zinc, and ethylaluminum sesquichloride for a time sufficient to effect trimerization and at a temperature at which reaction ensues in the range 25–150° C.

2. The process of claim 1 wherein R is phenyl and said catalyst is titanium tetrachloride and tributyl aluminum.

3. The process of claim 1 wherein R is trichloromethyl and said catalyst is titanium tetrachloride and trialkyl aluminum.

4. The process of claim 1 wherein R is t-butyl and said catalyst is titanium tetrachloride and trialkyl aluminum.

5. The process of claim 1 wherein R is 2-methylphenyl and said catalyst is titanium tetrachloride and trialkyl aluminum.

6. The process of claim 1 wherein R is naphthyl and said catalyst is titanium tetrachloride and trialkyl aluminum.

References Cited in the file of this patent

UNITED STATES PATENTS 2,598,811    Mahan et al. _____ June 3, 1952
2,872,446    Von Friedrich et al. _____ Feb. 3, 1959

FOREIGN PATENTS 812,250    Germany _____ Aug. 27, 1951

OTHER REFERENCES

Marvel et al.: J. of the Am. Chem. Soc., vol. 80, pp. 830–831 (1948).
Ziegler: Angew. Chem., vol. 64, pp. 323–329 (1952).
Chem. Abstracts, vol. 51, cols. 10,945–6 (1957).
Chem. Abstracts, vol. 51, 551 [subject index] (1957).
Hesse et al.: Annalen der Chemie, volume 607, pp. 24–35 (1957).
Chem. Abstracts, vol. 52, col. 17,789 (1958).
Chem. Abstracts, vol. 52, col. 14,305 (1958).
Chem. Abstracts, vol. 52, col. 17,085 (1958).
Chem. Abstracts, vol. 52, col. 5,032 (1958).